United States Patent
Fan et al.

(10) Patent No.: US 11,023,477 B2
(45) Date of Patent: Jun. 1, 2021

(54) METHOD AND SYSTEM FOR FUZZY KEYWORD SEARCH OVER ENCRYPTED DATA

(71) Applicant: Robert Bosch GmbH, Stuttgart (DE)

(72) Inventors: Xinxin Fan, San Mateo, CA (US); Qingji Zheng, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 172 days.

(21) Appl. No.: 16/474,721

(22) PCT Filed: Dec. 27, 2017

(86) PCT No.: PCT/EP2017/084609
§ 371 (c)(1),
(2) Date: Jun. 28, 2019

(87) PCT Pub. No.: WO2018/122238
PCT Pub. Date: Jul. 5, 2018

(65) Prior Publication Data
US 2020/0125563 A1    Apr. 23, 2020

Related U.S. Application Data

(60) Provisional application No. 62/440,880, filed on Dec. 30, 2016.

(51) Int. Cl.
  *G06F 16/24*  (2019.01)
  *G06F 16/2458*  (2019.01)
  (Continued)

(52) U.S. Cl.
  CPC ...... *G06F 16/2468* (2019.01); *G06F 16/2237* (2019.01); *G06F 16/2246* (2019.01);
  (Continued)

(58) Field of Classification Search
  CPC ............. G06F 16/2468; G06F 16/2237; G06F 16/2246; G06F 16/2455; H04L 9/088; H04L 9/0894
  (Continued)

(56) References Cited

U.S. PATENT DOCUMENTS 6,070,160 A * 5/2000 Geary ................... G06N 5/048
6,609,091 B1 * 8/2003 Budzinski ............ G06F 16/313
704/9

(Continued)

OTHER PUBLICATIONS

Zittrower "Encrypted Phrase Searching in the Cloud", year 2012.*
(Continued)

*Primary Examiner* — Hanh B Thai
(74) *Attorney, Agent, or Firm* — Maginot, Moore & Beck LLP

(57) ABSTRACT

A method for performing a fuzzy search in encrypted data includes receiving an encrypted search token corresponding to a search keyword with an untrusted server computing device and generating inner product values based on a function-hiding inner product encryption operation of the encrypted query vectors encrypted node vectors in an encrypted tree stored in the memory of the untrusted server computing device. The method further includes transmitting, with the untrusted server computing device, the encrypted keyword stored in the leaf node to a client computing device in response to the first inner product value exceeding a first predetermined similarity threshold corresponding to a similarity of the first query vector to the leaf node vector, the fuzzy search not revealing plaintext contents for any of a keyword stored in the leaf node, the search keyword, or a fuzziness parameter.

18 Claims, 7 Drawing Sheets

(51) Int. Cl.
  *G06F 16/22* (2019.01)
  *G06F 16/2455* (2019.01)
  *H04L 9/08* (2006.01)

(52) U.S. Cl.
  CPC .......... *G06F 16/2455* (2019.01); *H04L 9/088* (2013.01); *H04L 9/0894* (2013.01)

(58) Field of Classification Search
  USPC ........................................................ 707/780
  See application file for complete search history.

(56) References Cited

U.S. PATENT DOCUMENTS

| | | | | |
|---|---|---|---|---|
| 8,429,421 | B2* | 4/2013 | Chase | G06F 16/907 |
| | | | | 713/189 |
| 9,672,236 | B2* | 6/2017 | Spalka | H04L 9/14 |
| 9,679,005 | B2* | 6/2017 | Spalka | G06F 21/602 |
| 9,894,042 | B2* | 2/2018 | Dawoud | H04L 9/0637 |
| 9,998,145 | B2* | 6/2018 | Zhu | H03M 7/4006 |
| 10,063,528 | B2* | 8/2018 | Dawoud | H04L 67/1097 |
| 10,176,207 | B1* | 1/2019 | Dawoud | G06F 21/602 |
| 10,810,313 | B2* | 10/2020 | Cannings | G06N 3/02 |
| 2013/0042108 | A1* | 2/2013 | Cancedda | G06F 21/602 |
| | | | | 713/168 |
| 2014/0108435 | A1* | 4/2014 | Kolesnikov | G06F 21/6227 |
| | | | | 707/754 |
| 2014/0122476 | A1* | 5/2014 | Kaliski, Jr. | G06F 21/6218 |
| | | | | 707/736 |

OTHER PUBLICATIONS

Raykova et al. "Secure Anonymous Database Search", Nov. 13, 2009.*
International Search Report corresponding to PCT Application No. PCT/EP2017/084686 dated Apr. 4, 2018 (2 pages).
Chuah, et al., "Privacy-Aware BedTree Based Solution for Fuzzy Multi-keyword Search over Encrypted Data," 2011 31st International Conference on Distributed Computing Systems Workshops (9 pages).
Kim, et al., "Function-Hiding Inner Product Encryption is Practical," Security and Cryptography for Networks. SCN 2018. Lecture Notes in Computer Science, vol. 11035 (33 pages).
Zhangji, et al., "Toward Efficient Multi-Keyword Fuzzy Search Over Encrypted Outsourced Data With Accuracy Improvement," IEEE Transactions on Information Forensics and Security (vol. 11, Issue: 12 (11 pages).

* cited by examiner

METHOD AND SYSTEM FOR FUZZY KEYWORD SEARCH OVER ENCRYPTED DATA

CLAIM OF PRIORITY

This application is a 35 U.S.C. § 371 National Stage Application of PCT/EP2017/084609, filed on Dec. 27, 2018, which claims the benefit of U.S. Provisional Application No. 62/440,880, which is entitled "Method and System for Fuzz Keyword Search Over Encrypted Data," and was filed on Dec. 30, 2016, the entire contents of which are hereby expressly incorporated herein by reference.

FIELD

This disclosure relates generally to the fields of information security, and, more particularly, to systems and methods that search for keywords in an encrypted data structure.

BACKGROUND

Methods for performing searches of encrypted data that do not compromise the confidentiality of the encrypted data are known to the art. For example, in one common configuration a server computing device stores a large number of encrypted data files with an associated encrypted search index. One or more client computing devices make search requests to the server using encrypted representations of search keyword terms. Symmetric Searchable Encryption (SSE) is one method for performing searches in an encrypted search index that enables a client computing device that has access to a symmetric cryptographic key to perform searches for specific terms in the encrypted search index that is stored in the server. The server, however, only receives the encrypted search terms and cannot identify the content of the search terms based on the communications that are received from the client because the server does not have access to the (secret) cryptographic key required to decrypt the search terms.

Most existing searchable encryption systems enable a client to search for an exact search term or "keyword" in an encrypted search index. However, many practical applications use inexact or "fuzzy" searches to find keywords in a search index that are similar to, but often not identical to, the exact search keyword. Common uses of fuzzy searches include, but are not limited to, spell-checkers and search engines returns a list of results based on likely relevance even though search keywords and spellings may not exactly match. In some embodiments, a fuzzy search is generally conducted by computing a pre-defined distance metric between two words.

Prior art systems that attempt to combine fuzzy searching processes with symmetric searchable encryption utilize either wildcard-based fuzzy sets or locality sensitive hashing (LSH) functions to transform fuzzy keyword search to exact keyword search on encrypted data. While wildcard-based fuzzy sets incur significant overhead for storing the search index on the cloud server, LSH based methods introduce false positive and negative rates in the search results. In particular, both approaches require the predefined similarity metric to be built into the search index, which is not compatible to fuzzy search in plaintext domain. For example, many traditional plaintext fuzzy search techniques can specify the amount of error or "fuzziness" that can be applied to different searches to enable the search to retrieve broader ranges (higher error levels) or narrower ranges (lower error levels) of search results. The prior art encrypted fuzzy search processes, however, cannot accommodate individual search queries that change the fuzziness levels dynamically since the structure of the prior art encrypted fuzzy search indices specify a fixed level of fuzziness. Consequently, improvements to methods and systems for performing fuzzy searches in encrypted data would be beneficial.

SUMMARY

In one embodiment, a method for performing a fuzzy search in encrypted data has been developed. The method includes receiving, with an untrusted server computing device, a search token corresponding to a search keyword from a client computing device. The search token further includes a first query vector including encrypted data corresponding to occurrences of symbols in the search keyword and encrypted data corresponding to a first fuzziness parameter and a second query vector including encrypted data corresponding to the occurrences of symbols in the search keyword, encrypted data corresponding to a length of the search keyword relative to a predetermined maximum keyword length, and encrypted data corresponding to a second fuzziness parameter. The method further includes retrieving, with a processor in the untrusted server computing device, a non-leaf node in an encrypted tree stored in a memory of the untrusted server computing device. The non-leaf node includes a first non-leaf node vector including encrypted data corresponding to occurrences of symbols in all child nodes of the non-leaf node in the encrypted tree and encrypted data corresponding to a predetermined multiplier corresponding to the first fuzziness parameter in the first query vector. The method further includes generating, with the processor in the untrusted server computing device, a first inner product value based on a function-hiding inner product encryption operation of the first query vector and the first non-leaf node vector, retrieving, with the processor in the untrusted server computing device, a leaf node of the encrypted tree that is connected to the non-leaf node in the encrypted tree in the memory in response to the first inner product value exceeding a first predetermined similarity threshold corresponding to a similarity of the first query vector to the first non-leaf node vector. The leaf node includes an encrypted keyword stored in the leaf node; and a first leaf node vector including encrypted data corresponding to occurrences of symbols in the keyword stored in the leaf node, encrypted data corresponding to a length of the keyword stored in the leaf node relative to a predetermined maximum keyword length, and encrypted data corresponding to a predetermined multiplier corresponding to the second fuzziness parameter in the second query vector. The method further includes generating, with the processor in the untrusted server computing device, a second inner product value using the function-hiding inner product encryption operation of the second query vector and the first leaf node vector, and transmitting, with the untrusted server computing device, the encrypted keyword stored in the leaf node to the client computing device in response to the second inner product value exceeding a second predetermined similarity threshold corresponding to a similarity of the second query vector to the first leaf node vector, the fuzzy search not revealing plaintext contents for any of the keyword stored in the leaf node, the search keyword, the first fuzziness parameter, or the second fuzziness parameter.

In a further embodiment, the search token received from the client computing device includes a third query vector including encrypted data corresponding to at least one length of a keyword in a search range that corresponds to a length of the search keyword and the non-leaf node retrieved with the processor in the untrusted server computing device includes a second non-leaf node vector including encrypted data corresponding to lengths of keywords stored in all child nodes of the non-leaf node in the encrypted tree. The method includes generating, with the processor in the untrusted server computing device, a third inner product value based on a function-hiding inner product encryption operation of the third query vector and the second non-leaf node vector, and retrieving, with the processor, the leaf node of the encrypted tree that is connected to the non-leaf node in the encrypted tree in the memory in response to the first inner product value exceeding the predetermined similarity threshold and the third inner product value being not equal to zero.

In a further embodiment, the method includes generating, with the processor in the untrusted server computing device, the first inner product value and the second inner product value using public system parameter data that correspond to an encryption key that the client computing device used to generate the encrypted data in the first query vector and the second query vector.

In a further embodiment, the public system parameter data are stored in the memory of the untrusted server computing device.

In a further embodiment, the public system parameter data are included in the search token received from the client computing device.

In a further embodiment, the includes generating, with the processor in the untrusted server computing device using the function-hiding inner product encryption operation and the public system parameter data, the first inner product value that is equivalent to a numeric value of a dot product of plaintext contents of the first query vector and plaintext contents of the first non-leaf vector, wherein the function-hiding inner product encryption operation does not reveal plaintext contents of the first query vector and the first non-leaf node vector to the untrusted server computing device.

In a further embodiment, the first fuzziness parameter corresponds to: $|w|-q-q-ED$ where $|w|$ is a length of the search keyword, q is a predetermined q-gram number used to form the encrypted tree, and ED is a numeric edit distance quantity generated by the client computing device as part of the search token, and the second fuzziness parameter corresponds to $U_{LEN}+q+q*ED$ where $U_{LEN}$ is the predetermined maximum keyword length.

In a further embodiment, the first predetermined similarity threshold and the second predetermined similarity threshold are both zero, the first inner product value exceeding the first predetermined similarity threshold in response to the first inner product value having a positive numeric value, and the second inner product value exceeding the second predetermined similarity threshold in response to the second inner product value having a positive numeric value.

In another embodiment, a method for performing a fuzzy search in encrypted data includes receiving with an untrusted server computing device a search token corresponding to a search keyword from a client computing device. The search token includes a first query vector including encrypted data corresponding to the occurrences of symbols in the search keyword, encrypted data corresponding to a length of the search keyword relative to a predetermined maximum keyword length, and encrypted data corresponding to a fuzziness parameter. The method further includes retrieving, with the processor, a leaf node of an encrypted tree stored in a memory of the untrusted server computing device. The leaf node includes an encrypted keyword stored in the leaf node and a first leaf node vector including encrypted data corresponding to occurrences of symbols in the keyword stored in the leaf node, encrypted data corresponding to a length of the keyword stored in the leaf node relative to a predetermined maximum keyword length, and encrypted data corresponding to a predetermined multiplier corresponding to the second fuzziness parameter in the first query vector. The method further includes generating, with the processor in the untrusted server computing device, a first inner product value using a function-hiding inner product encryption operation of the first query vector and the first leaf node vector, and transmitting, with the untrusted server computing device, the encrypted keyword stored in the leaf node to the client computing device in response to the first inner product value exceeding a first predetermined similarity threshold corresponding to a similarity of the first query vector to the leaf node vector, the fuzzy search not revealing plaintext contents for any of the keyword stored in the leaf node, the search keyword, or the fuzziness parameter.

In a further embodiment, the search token received from the client computing device further includes a second query vector including encrypted data corresponding to at least one length of a keyword in a search range that corresponds to a length of the search keyword and the leaf node retrieved with the processor in the untrusted server computing device further includes a second leaf node vector including encrypted data corresponding to a length of the encrypted keyword stored in the leaf node. The method further includes generating, with the processor in the untrusted server computing device, a second inner product value based on a function-hiding inner product encryption operation of the second query vector and the second leaf node vector, and transmitting, with the processor, the encrypted keyword stored in the leaf node to the client computing device in response to the first inner product value exceeding the first predetermined similarity threshold and the second inner product value being not equal to zero.

In another embodiment, an untrusted computing device configured to perform fuzzy searches in encrypted data has been developed. The untrusted computing device includes a network interface device configured to transmit and receive data from a trusted client computing device using a data network, a memory configured to store an encrypted tree stored comprising at least one non-leaf node and at least one leaf note, and a processor operatively connected to the network interface device and the memory. The processor is configured to receive a search token corresponding to a search keyword from the trusted client computing device. The search token further includes a first query vector including encrypted data corresponding to occurrences of symbols in the search keyword and encrypted data corresponding to a first fuzziness parameter and a second query vector including encrypted data corresponding to the occurrences of symbols in the search keyword, encrypted data corresponding to a length of the search keyword relative to a predetermined maximum keyword length, and encrypted data corresponding to a second fuzziness parameter. The processor is further configured to retrieve a non-leaf node in the encrypted tree stored in the memory. The non-leaf node includes a first non-leaf node vector including encrypted data corresponding to occurrences of symbols in all child nodes of the non-leaf node in the encrypted tree and encrypted data corresponding to a predetermined multiplier corresponding to the first fuzziness parameter in the first query vector. The processor is further configured to generate a first inner product value based on a function-hiding inner product encryption operation of the first query vector and the first non-leaf node vector and retrieve a leaf node of the encrypted tree that is connected to the non-leaf node in the encrypted tree in the memory in response to the first inner product value exceeding a first predetermined similarity threshold corresponding to a similarity of the first query vector to the first non-leaf node vector. The leaf node includes an encrypted keyword stored in the leaf node and a first leaf node vector including encrypted data corresponding to occurrences of symbols in the keyword stored in the leaf node, encrypted data corresponding to a length of the keyword stored in the leaf node relative to a predetermined maximum keyword length, and encrypted data corresponding to a predetermined multiplier corresponding to the second fuzziness parameter in the second query vector. The processor is further configured to generate a second inner product value using the function-hiding inner product encryption operation of the second query vector and the first leaf node vector, and transmit the encrypted keyword stored in the leaf node to the client computing device in response to the second inner product value exceeding a second predetermined similarity threshold corresponding to a similarity of the second query vector to the first leaf node vector, the fuzzy search not revealing plaintext contents for any of the keyword stored in the leaf node, the search keyword, the first fuzziness parameter, or the second fuzziness parameter.

In a further embodiment, the processor is further configured to receive the search token received from the trusted client computing device further including a third query vector including encrypted data corresponding to at least one length of a keyword in a search range that corresponds to a length of the search keyword. The processor is further configured to retrieve the non-leaf node further including a second non-leaf node vector including encrypted data corresponding to lengths of keywords stored in all child nodes of the non-leaf node in the encrypted tree. The processor is further configured to generate a third inner product value based on a function-hiding inner product encryption operation of the third query vector and the second non-leaf node vector, and retrieve the leaf node of the encrypted tree that is connected to the non-leaf node in the encrypted tree in the memory in response to the first inner product value exceeding the predetermined similarity threshold and the third inner product value being not equal to zero.

In a further embodiment, the processor is further configured to generate the first inner product value and the second inner product value using public system parameter data that correspond to an encryption key that the client computing device used to generate the encrypted data in the first query vector and the second query vector.

In a further embodiment, the public system parameter data are stored in the memory of the untrusted server computing device.

In a further embodiment, the public system parameter data are included in the search token received from the client computing device.

In a further embodiment, the processor is further configured to generate the first inner product value that is equivalent to a numeric value of a dot product of plaintext contents of the first query vector and plaintext contents of the first non-leaf vector using the function-hiding inner product encryption operation and the public system parameter data, wherein the function-hiding inner product encryption operation does not reveal plaintext contents of the first query vector and the first non-leaf node vector to the untrusted server computing device.

In a further embodiment, the first fuzziness parameter corresponds to: $|w|-q-q-ED$ where $|w|$ is a length of the search keyword, q is a predetermined q-gram number used to form the encrypted tree, and ED is a numeric edit distance quantity generated by the client computing device as part of the search token, and the second fuzziness parameter corresponds to $U_{LEN}+q+q*ED$ where $U_{LEN}$ is the predetermined maximum keyword length.

In a further embodiment, the first predetermined similarity threshold and the second predetermined similarity threshold are both zero, the first inner product value exceeding the first predetermined similarity threshold in response to the first inner product value having a positive numeric value, and the second inner product value exceeding the second predetermined similarity threshold in response to the second inner product value having a positive numeric value.

This disclosure presents a secure and efficient fuzzy symmetric searchable encryption scheme based on the strategy of "server filter then user verification". The proposed scheme is constructed from integrating a new data structure called filter tree and the novel application of function-hiding inner product encryption. This disclosure presents a filter tree search index data structure, which is an augmented tree based on the length and q-gram set of the keyword and enables efficient retrieval of similar keywords during a fuzzy search. This disclosure presents an efficient method to achieve privacy-preserving comparison in the filter tree through usage of function-hiding inner product encryption (IPE). This disclosure also presents an efficient fuzzy symmetric searchable encryption (SSE) scheme based on the privacy-preserving filter tree and the strategy of "server filter then user verification".

DETAILED DESCRIPTION

Figure 1:
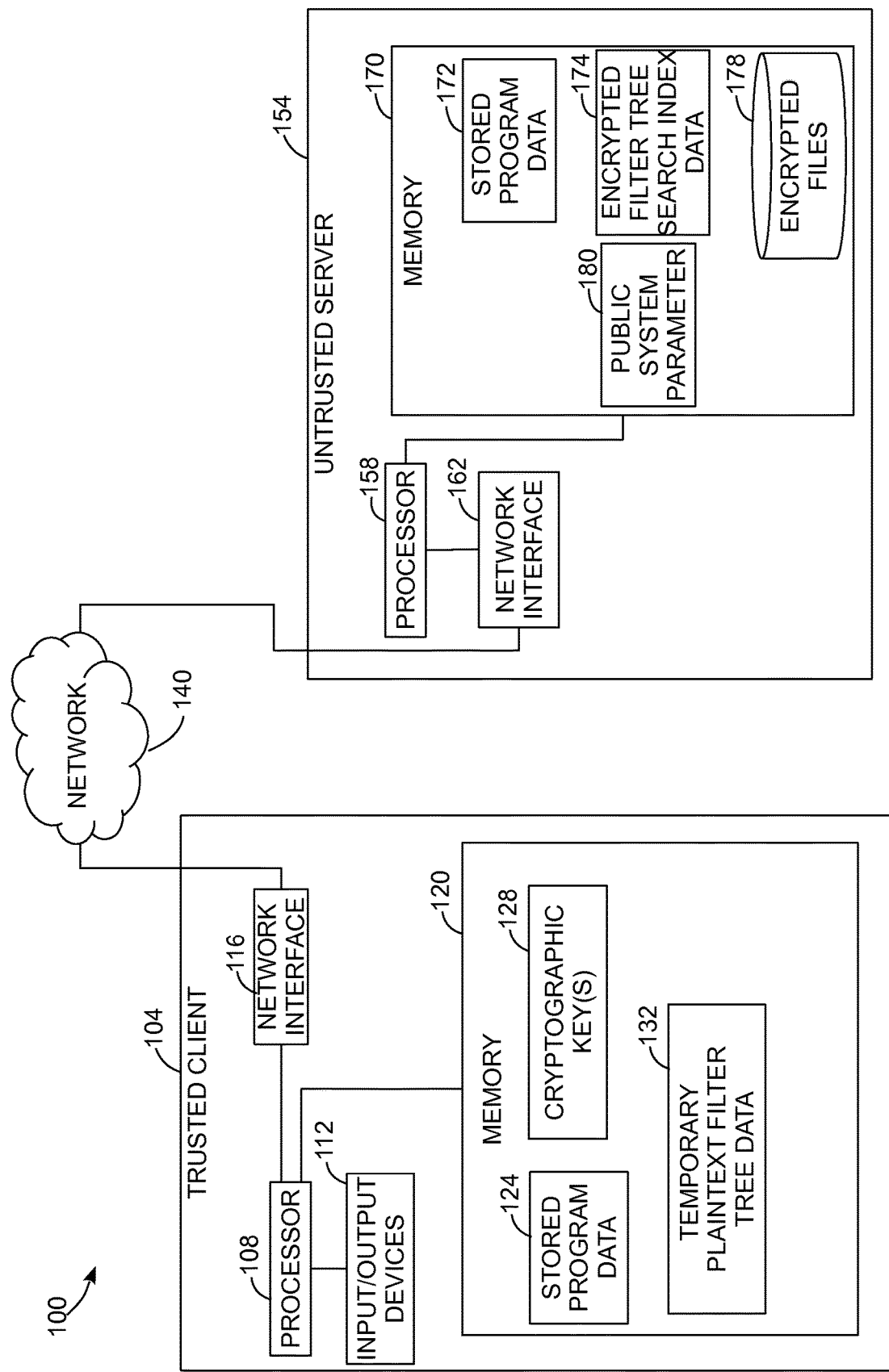
FIG. 1 is a schematic diagram of a system that enables a trusted client computing device to send encrypted fuzzy keyword search queries to an untrusted server computing device where the untrusted server computing device performs fuzzy search operations without being able to identify the plaintext contents of the encrypted filter tree search index or the plaintext contents of search queries received from the trusted client computing device.

For the purposes of promoting an understanding of the principles of the embodiments described herein, reference is now made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

Definitions that pertain to the systems and methods described herein are set forth below. As used herein, the term "file" refers to any set of structured data that can be encrypted and stored in the memory of an untrusted server computing device. Examples of files include human or machine readable text and binary data, image data, video data, audio data, and other documents that are stored in a filesystem of a digital computing device. Additional examples of files include, for examples, individual rows or other subsets of tables that are stored within a relational database or other objects in a structured data store.

As used herein, the term "keyword" refers to a set of data corresponding to a value that is contained in one or more files. A search process identifies the value in the files. In particular, keywords correspond to values that cover a predetermined range such as a numeric range, alphabetical range, or any other set of data values that are the subject of search queries. A "plaintext" or "unencrypted" keyword refers to the value itself in a machine or human readable format while a "ciphertext" or "encrypted" keyword refers to a set of encrypted data that are generated using the plaintext data and a cryptographic key using a predetermined encryption process.

As used herein the term "trusted" refers to a computing device that has access to one or more cryptographic keys that enable the computing device to encrypt and decrypt plain text data. In the embodiments that are described below, a client computing device is the "trusted" computing device and a server computing device is the "untrusted" computing device. The trusted client computing device generates an encrypted filter tree search index and generates encrypted fuzzy keyword search queries for the encrypted filter tree search index. The untrusted server computing device stores the encrypted filter tree search index and performs searches using the encrypted search queries that are received from the trusted client computing device. However, the untrusted server computing device is incapable of determining the plaintext contents of the encrypted filter tree, which is to say that the untrusted server cannot determine the contents of the keywords that are stored in the encrypted filter tree or other information including keyword lengths and q-gram information that is stored in the encrypted filter tree. Additionally, the server is also incapable of determining the plaintext contents of encrypted search queries that are sent from the trusted client computing device, which is to say that the untrusted server cannot determine the plaintext keyword that is used in a fuzzy search query from the trusted client computing device.

As used herein, the term "q-gram" refers to a consecutive substring length within a larger string s that can be used to construct the string s. The set GM(q, s) is defined as a set of pairs of q-gram and the number of occurrences. For example, given the string s="hello", the 1-gram set (i.e., q=1) is GM(1, s)={(e, 1), (h, 1), (l, 2), (o, 1)}, which is presented in alphabetical order by way of example. In the examples described herein, the string set s includes strings that are formed from letters of the English language (26 letters and capitalization is ignored) and with q-grams where q=1 (1-grams). This means that each letter of the alphabet is treated as an individual symbol and the set GM(q, s) includes a count of each letter that is present in a single string s or in larger groups of strings within a filter tree search index hierarchy. However, those of skill in the art will recognize that the keyword strings used for both a search index and the search queries can include symbols other than standard English letters including non-English letters, logographs of languages such as Chinese, numbers and symbols or, more generally, any set of data encoded as sequences of binary symbols or any other suitable encoding technique, meaning that a "keyword" is not strictly required to be a word in a traditional human language. Furthermore, alternative embodiments may use q-grams where q>1 to perform fuzzy searching using sequences of two or more symbols instead of individual symbols as the basis for forming a fuzzy search index using the embodiments described herein.

One practical example of a suitable symmetric key encryption scheme that is known to the art is the advanced encryption system (AES) scheme. As described in more detail below, the trusted client computing device generates multiple symmetric encryption/decryption keys that are stored only in the memory of the trusted client computing device and are not shared with any of the server computing devices or other untrusted computing devices.

FIG. 1 depicts one embodiment of a system 100 that includes a trusted client computing device ("client") 104 and an untrusted server computing device 154 ("server"), with the illustrative example of FIG. 1 including the untrusted server computing device 154. The client 104 is communicatively connected to the server 154 through a data network 140. The data network 140 is, for example, a local area network (LAN), a wide area network (WAN), or a combination of two or more LAN and WAN networks that enables bi-directional communication between the client 104 and server 154. In other embodiments, however, the network 140 could be an I/O channel that connects two computing devices directly via, for example, a universal serial bus (USB) connection or other suitable peripheral interconnection standard. More generally, the network 140 provides physical and logical separation required to prevent the processor 158 in the untrusted server 154 from accessing the cryptographic keys 128 or other non-public data that are stored in the memory 120 of the client computing device 104.

In the system 100, the client computing device 104 is a "trusted" computing device meaning that the client 104 has access to cryptographic keys 128 that are described in more detail below. The cryptographic keys 128 enable the client 104 to encrypt data including both files and search index data that are used to search for keywords within encrypted files and to decrypt any of the encrypted data. The server 154 is considered to be "unfrosted" in that the server 154 does not have access to the cryptographic keys 128 and the server 154 should not gain access to the plaintext (unencrypted) data in either of the filter tree fuzzy search index 174 or the encrypted file data 178.

During the search operations that are described herein, the server 154 receives search query messages from the client 104 that include a token with multiple encrypted vectors that the processor 158 uses to perform fuzzy searches in the encrypted filter tree search index 174. The server 150 identifies encrypted keywords in the encrypted filter tree search index 174 that meet the requirements of the fuzzy search token without being able to determine any of the contents of the plaintext data that are encrypted in the filter search tree search index 174 and the plaintext data that are encoded in the search token received from the client computing device, which include both the plaintext of the keyword used for the fuzzy search query and parameter data such as the selected ED parameter that adjusts the scope of the fuzzy search query.

The client computing device 104 is a digital computing device that includes a processor 108, one or more input/output (I/O) devices 112, a network interface device 116, and a memory 120. The processor 108 is a digital logic device that includes, for example, one or more central processing unit (CPU) cores, graphical processing unit (GPU) cores, digital signal processing (DSP) units, and any other suitable digital logic devices. In some embodiments the processor 108 includes multiple discrete processing devices, such as separate CPU and GPU components, while in other embodiments the processing devices are integrated into a single digital logic device in a System on a Chip (SoC) configuration. The I/O devices 112 include, for example, keyboards, mice, touch input devices, speech input devices, and audio/video output devices that enable a user to enter commands to control the client 104 and receive output information from the client 104. In particular, the client 104 performs searches in the encrypted data files that are stored in the untrusted server 154 and the I/O devices 112 enable a user to provide keywords for fuzzy keyword searches and to receive output from the client 104 with the results of the searches. The network interface device 116 is, for example, a wired or wireless network adapter that communicatively couples the client 104 to the server 154 through the data network 140.

The memory 120 includes one or more data storage devices including non-volatile data storage devices such as magnetic, optical, or solid-state drives and volatile data storage devices such as static and dynamic random access memory (RAM). In the configuration of FIG. 1, the memory 120 holds stored program instruction data 124, cryptographic key data 128, and temporary memory storage for a plaintext filter tree search index 132 that stores the filter tree search index data prior to encryption by the trusted client 104 and transmission to the untrusted server 154. The stored program data 124 includes one or more software programs that enable the client 104 to perform the operations described herein including, but not limited to, encrypting and decrypting file, keyword, and search index data, generating a filter tree search index to enable fuzzy searches, generating search query tokens based on a search keyword, and decrypting search results and encrypted files that are received from the server 154.

The cryptographic keys 128 include at least one set of secret data with a predetermined key size (e.g. 128 bits or 256 bits) that is known only to the client 104 and not to the server 154 or other third parties. The processor 108 generates the cryptographic keys using a secure key generation process that is otherwise known to the art and not described in further detail herein. The client 104 uses a symmetric encryption and decryption scheme that is otherwise known to the art for secure encryption and decryption of data, such as the advanced encryption system (AES), to encrypt and decrypt file data and encrypted keywords that are stored in the search index. Additionally, the processor 108 in the trusted client 104 performs function-hiding inner product encryption to generate the structure of the encrypted filter tree search index and to generate encrypted search query tokens for the encrypted search index. As described in more detail herein, the trusted client 104 uses a symmetric function-hiding inner product encryption scheme to encrypt a filter tree search index and to encrypt search tokens in one or more search queries. The filter tree search index and symmetric inner product encryption scheme described herein enables the trusted client computing device 104 and the untrusted server computing device 154 to perform fuzzy searches for keywords in which the plaintext contents of keywords in the filter tree search index and plaintext search keyword information in the search token are not revealed to the untrusted server 154.

The untrusted server computing device 154 is a digital computing device that includes a processor 158, a network interface device 162, and a memory 170. The processor 158, network interface device 162, and memory 170 are structurally similar to the processor 108, network interface 116, and memory 120 of the client 104, respectively, although in some embodiments the server 154 includes more computational and storage capacity than the client 104 to enable a single server 154 to provide services to a large number of clients that are each configured in the same manner as the client 104 in FIG. 1.

In the server 154, the memory 170 holds stored program instructions 172, encrypted filter tree search index data 174, optionally encrypted files 178, and optionally a set of public system parameter data 180. The server 154 executes the stored program data 172 to implement the operations described herein including, but not necessarily limited to, processing search queries based on encrypted search tokens that are received from the client 104 to perform fuzzy searches using the encrypted filter tree search index 174 and return encrypted search results from the encrypted filter tree search index 174. The server 154 optionally processes file requests from the client 104 to transmit selected encrypted file data 178 to the client 104. The server 154 also stores encrypted filter tree search index data 174 and encrypted file data 178 that are received from the client 104.

Figure 2:
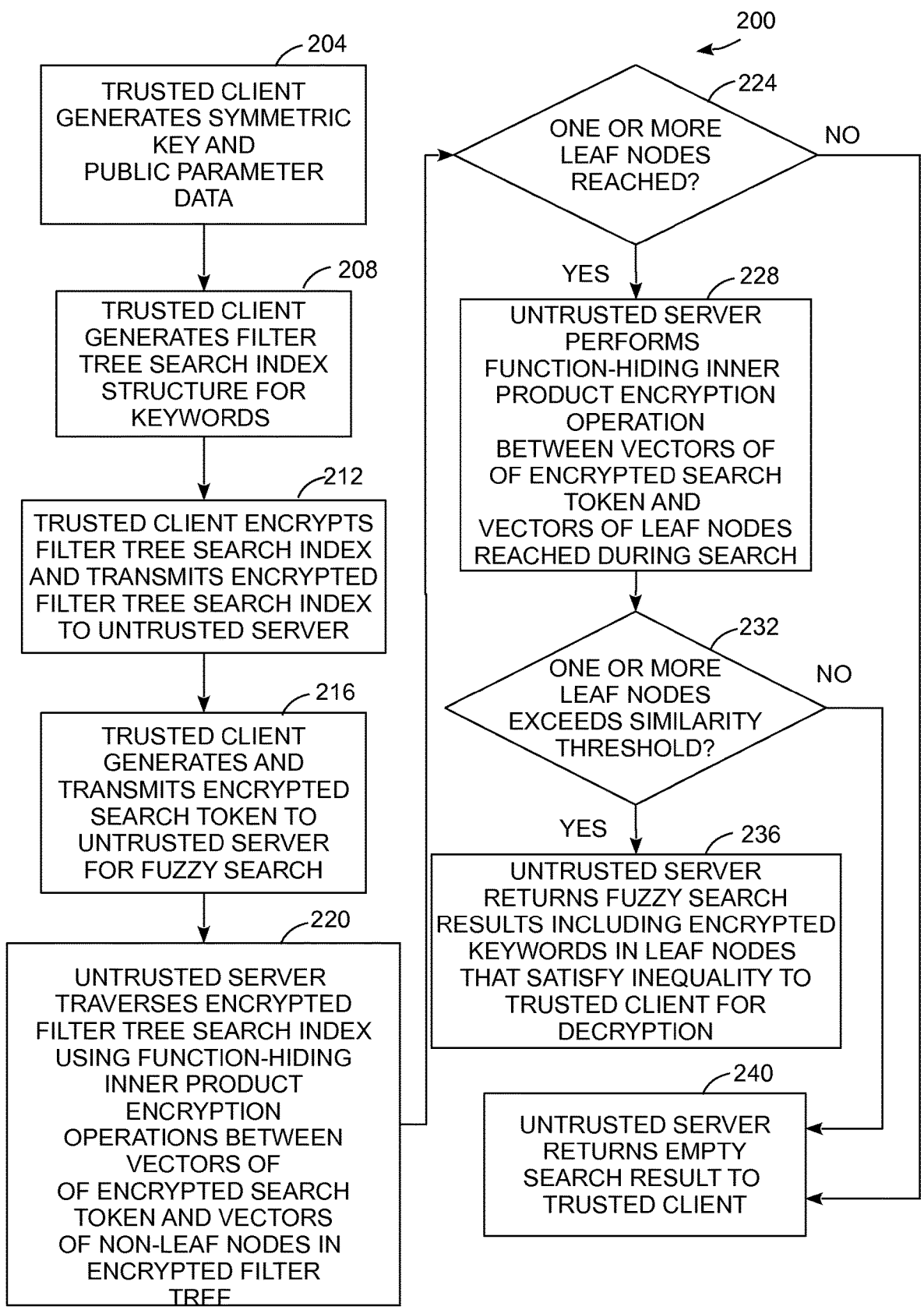
FIG. 2 is a block diagram of a process for generating an encrypted filter tree search index and using the encrypted filter tree search index to perform fuzzy keyword searches.

FIG. 2 depicts a process 200 for generating an encrypted filter tree search index and using the encrypted filter tree search index to perform fuzzy searches in a symmetric searchable encryption system. In the description below, a reference to the process 200 performing a function or action refers to the operation of at least one processor in at least one computing device to execute stored program instructions to perform the function or action. The process 200 of FIG. 2 is described in conjunction with the system 100 of FIG. 1 for illustrative purposes.

The process 200 is an embodiment of a fuzzy searchable symmetric encryption (FSSE) scheme. In particular, the process 200 implements four operations including key generation, encrypted search index generation, encrypted fuzzy keyword search token generation, and a fuzzy keyword search operation that returns encrypted results from the encrypted search index using the encrypted search token without revealing plaintext information about the contents of the search index or the token to the untrusted computing device that performs the search operation. These operations are also referred to as:

1. (mk,param)←Setup($1^l$): Given a security parameter l, the data owner runs this algorithm to generate the symmetric secret key mk and the public system parameter param. The key mk is a symmetric secret key that is also referred to as the "master" key because the trusted client computing device 104 uses the key mk to generate an additional symmetric cryptographic key skx that is used to encrypt elements in the search index as is described in more detail below. For the sake of the simplicity, we implicitly assume that the following algorithms take param as part of input. The trusted client generates the secret key mk and the public system parameter param. The untrusted server never gains access to the secret key mk although the untrusted server intentionally receives the public system parameter param data, which are used in function-hiding inner product encryption operations that are described in further detail below.

2. (index, EDB)←BuildIndex(sk$_X$, DB): Given the data set DB to be outsourced, the data owner runs this algorithm to generate a secure index and a set of encrypted files EDB. In particular, a corpus of keywords can be the data set DB that is subject to the fuzzy search. In some embodiments, the encrypted data further includes identifiers of encrypted files that include the keywords in a search index although the fuzzy search identifies the keywords themselves.

3. token←GenToken(mk, w$_Q$): Given the queried keyword w$_Q$, the data owner runs this algorithm to generate an encrypted search token using the master key mk. The trusted client 104 generates the encrypted search token and transmits the encrypted search token to the untrusted server 154.

4. result←Search((sk, w$_Q$), (token, index, EDB)): The untrusted server 154, taking as input token, index, EDB, and the trusted client 104, taking as input sk, w$_Q$, perform a fuzzy search to identify similar encrypted keywords in the search index that are similar to the encrypted search keyword w$_Q$. The untrusted servers transmit the encrypted keyword results from the search index to the client for decryption and, in some embodiments, the encrypted entries also include identifiers for encrypted files that include the keyword results to enable the trusted client computing device to retrieve encrypted files that contain keywords from the fuzzy search operation.

The process 200 begins as the trusted client computing device 104 generates a cryptographically secure symmetric key mk and public system parameter data param that enable the trusted client to encrypt data and generate the encrypted filter tree data search index described herein (block 204). In one embodiment, the trusted client computing device 104 uses a known symmetric key cryptographic key generation technique to generate the symmetric key sk in a secure manner with a sufficient key length (e.g. 128 bits or 256 bits) to provide practical cryptographic security for encrypted data that prevents the untrusted server 154 from determining the plaintext contents of encrypted data in a practical manner. The public system parameter data param is a set of data that enables the untrusted server 154 to perform function-hiding inner product encryption operations between two encrypted vectors to generate a numeric inner product value that is the same value that would be generated between the plaintext versions of the same vectors, where the function-hiding inner product encryption operation does not reveal the plaintext contents of the either vector to the untrusted server 154. As described in further detail below, the two encrypted vectors in the process 200 include one vector contains encrypted data in a non-leaf node or leaf node of the encrypted filter tree search index and another vector that contains encrypted data as part of a search token that the trusted client 104 transmits to the untrusted server 154. The trusted client computing device 104 stores the key mk and other cryptographic keys 128 in the memory 120. The processor 108 uses the cryptographic keys 128 for both encryption of the filter tree search index data and data in search tokens that are sent to the unfrosted server computing device 154 and for decryption of encrypted fuzzy search results and encrypted files that the trusted client computing device 104 receives from the untrusted server computing device 154.

Process 200 continues as the trusted client computing device 104 generates an encrypted filter tree search index, which is the BuildIndex function described above (block 208). The client computing device 104 uses a corpus of keywords that are included in the search, where the keywords are, for example, searchable terms that are included in encrypted file data. The illustrative embodiments of this application include a corpus of four search keywords: ("sum", "marry", "hello", "world"), although alternative filter search trees include different keywords and, as described above the keywords can include different sets of searchable symbols and may not be "words" in a standard language such as English.

During process 200, the client computing device 104 generates the filter search tree as, for example, a binary tree with a plurality of nodes starting from a single "root" node that is connected to one or more "leaf" nodes either directly or through one or more layers of intermediate non-leaf nodes. Each of the nodes is formed from two vectors with the GM vector that encode the frequency with which q-gram symbols (where q=1 and the symbols are text letters in the illustrative examples herein) occur in keywords and the LEN vector encoding length information about how many q-grams form the keywords. The non-leaf nodes store aggregate information about all of the child leaf and non-leaf nodes in the tree. The leaf nodes store information for a single keyword, and in the embodiments described herein the leaf node includes the individual keyword in an encrypted form.

Figure 3:
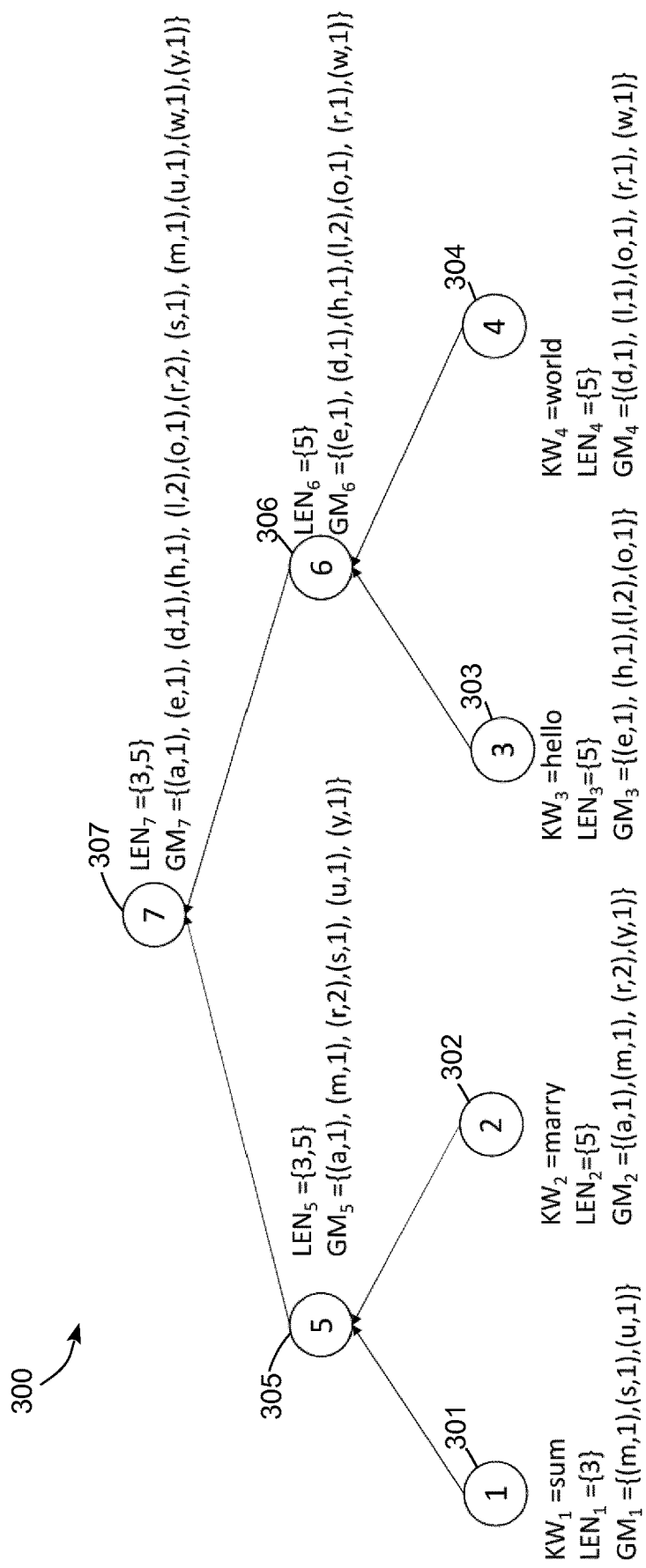
FIG. 3 is a diagram that depicts a filter tree search index that a trusted client computing device generates to perform fuzzy search operations.

FIG. 3 depicts a search tree 300 that the trusted client computing device 104 generates during the process 200 based on the sample corpus of ("sum", "marry", "hello", "world") using a set of 26 symbols corresponding to letters of the English alphabet and a q=1 q-gram model. During the process 200, the processor 108 in the trusted client computing device generates the leaf nodes based on the plaintext keywords that are encoded in the search index. The processor 108 then generates the non-leaf nodes starting with pairs of leaf nodes to generate the non-leaf nodes 305 and 306, and subsequently generates the root node based on the contents of the non-leaf nodes 305 and 306. In at least some embodiments the leaf nodes 301-304 are arranged in a randomized (e.g. not alphabetized or organized in any other predetermined arrangement) order to prevent the untrusted server computing device 154 from being able to infer information about the plaintext contents of keywords or other elements in the filter tree search index based on the structure of the encrypted filter tree search index.

The tree 300 of FIG. 3 is referred to as a "filter" search tree because all of the non-leaf nodes (root node 307 and intermediate nodes 305 and 306) include aggregate information about all of the child nodes under each non-leaf node. As described in further detail below, if a non-leaf node does not satisfy the inequality comparisons of a fuzzy query, then the fuzzy search operation can stop at the non-leaf node without having to fully traverse the child nodes because the non-leaf node includes aggregate symbol GM and keyword length LEN information about all of the child nodes, so the search operation filters out the child nodes since none of the child nodes will match the fuzzy search if the higher level non-leaf node does not satisfy the inequality.

Referring to leaf node 303 by way of example, the processor 108 generates a GM vector GM$_2$ that includes an entry for each letter in the keyword "marry" associated with the number of occurrences of each symbol (1 for each of 'a', 'in', and 'y', and 2 for 'r'). The LEN vector LEN$_2$ stores the q-gram length of the keyword, which is 5 for a five letter world in the q=1 example of the filter tree 300. FIG. 3 depicts the information that is encoded in the GM vectors and a more precise structure of the GM vector for a leaf node is described below in conjunction with FIG. 5B.

Referring to the intermediate non-leaf node 305 by way of example, each non-leaf node includes a GM vector and a LEN vector, but instead of storing data about an individual keyword, the non-leaf nodes store a vector GM with data corresponding to occurrences of symbols in all child nodes of the non-leaf node and a LEN vector that stores data corresponding to the lengths of all of the child nodes of the non-leaf node. In particular, the non-leaf node 305 has $GM_5$ that includes an entry for 'a', 'r', and 'y' from the child node 302, entries for 'u' and 's' for the keyword "sum" in the other child node 301, and entries for the letter 'm' that is present in the keywords for both of the leaf nodes 301 and 302. Note that the numeric values in the vector $GM_5$ correspond to the maximum number of occurrences of a symbol in any single keyword in the child nodes. Therefore, the vector $GM_5$ includes entry (r, 2) since 'r' occurs twice in "marry" (but zero times in the keyword "sum" for the leaf node 301), but $GM_5$ includes the entry (m, 1) for the letter 'm' even thought 'm' occurs in the keywords for both the leaf nodes 301 and 302 because the highest frequency of occurrence for 'm' in any single keyword of nodes 301 and 302 is still only 1. The non-leaf node 305 also includes a LEN vector LENS that includes aggregate data for the lengths of keywords in all of the child nodes, {3, 5} for the 3 letter keyword in leaf node 301 and the 5 letter keyword in leaf node 302.

During process 200, the processor 108 in the trusted client computing device generates the filter tree including all of the leaf and non-leaf nodes in the filter tree, such as the tree 300 of FIG. 3, up to a single root node (node 307 in FIG. 3). In the filter tree 300, the processor 108 generates the root node 307 another GM vector that includes aggregate data about all of the occurrences of symbols in the entire filter tree 300 and a LEN vector that includes aggregate data about all of the lengths of keywords in the filter tree. During the process 200, the processor 108 in the trusted client computing device 104 generates a plaintext version of the filter tree search index and stores at least a portion of the filter tree search index as temporary plaintext filter tree data 132 in the memory 120. The client computing device 104 generates the filter tree search index nodes using vector structures that are described below and the client computing device encrypts the contents of the vector structures in the nodes of the filter tree search index prior to transmitting the encrypted filter tree search index to the untrusted server computing device 154.

Figure 4:
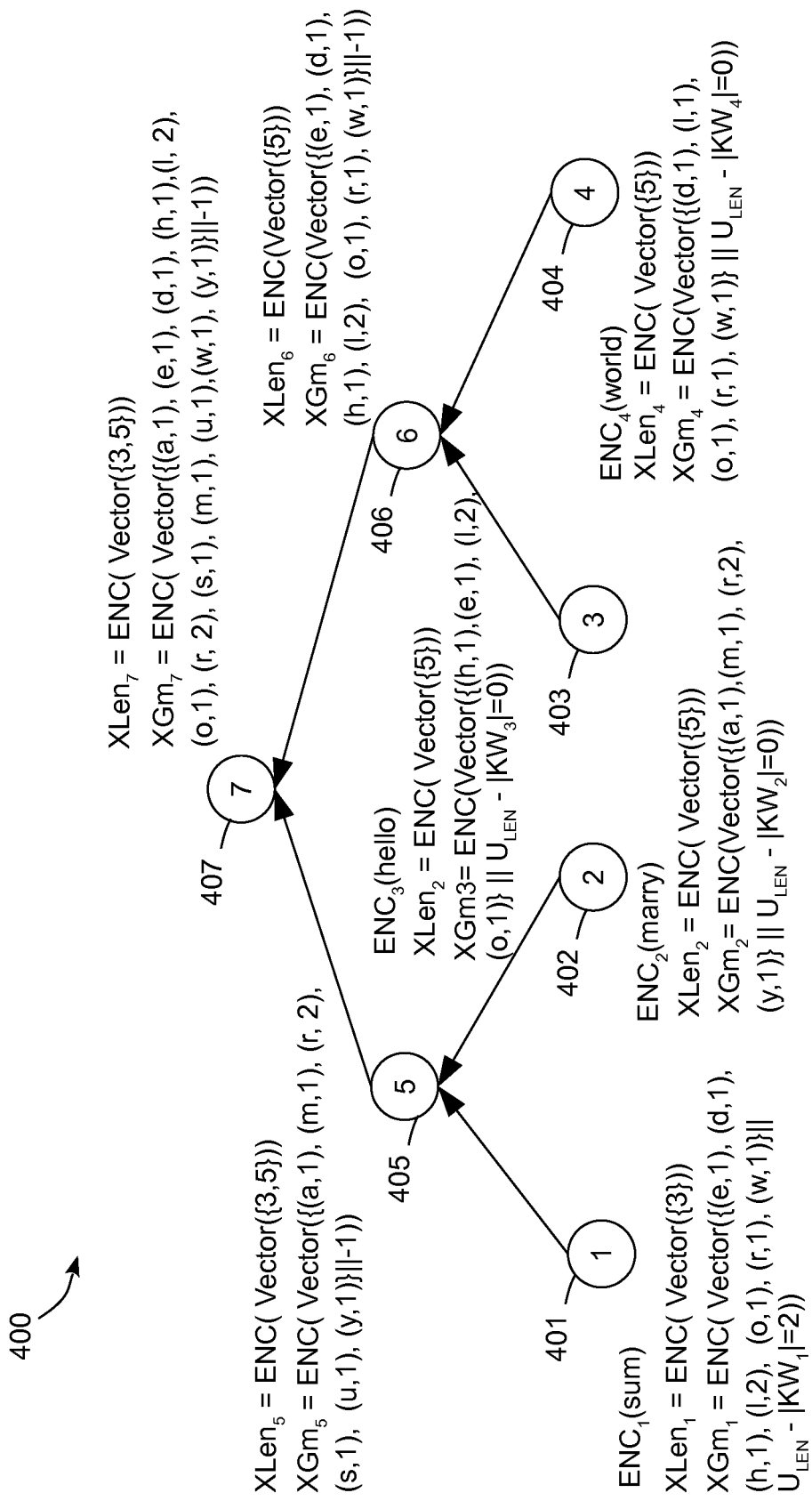
FIG. 4 is a diagram of an encrypted filter tree search index based on the filter tree search index of FIG. 3 that the trusted client computing device generates and transmits to the untrusted server to enable the untrusted server that perform searches of the encrypted filter tree search index using encrypted search queries received from the client.
Figure 5A:
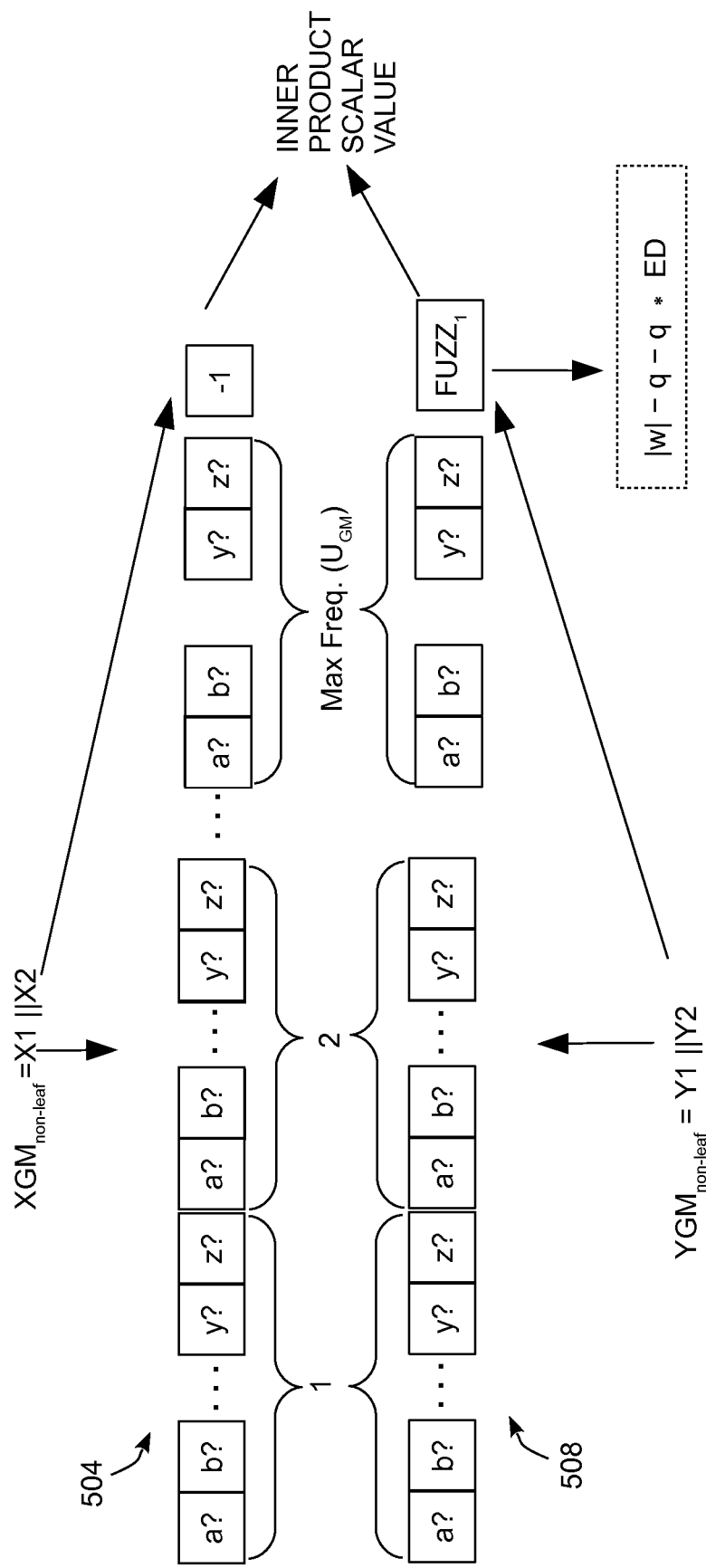
FIG. 5A is an example of vectors used to compare search queries with non-leaf nodes in a filter tree search index.
Figure 5B:
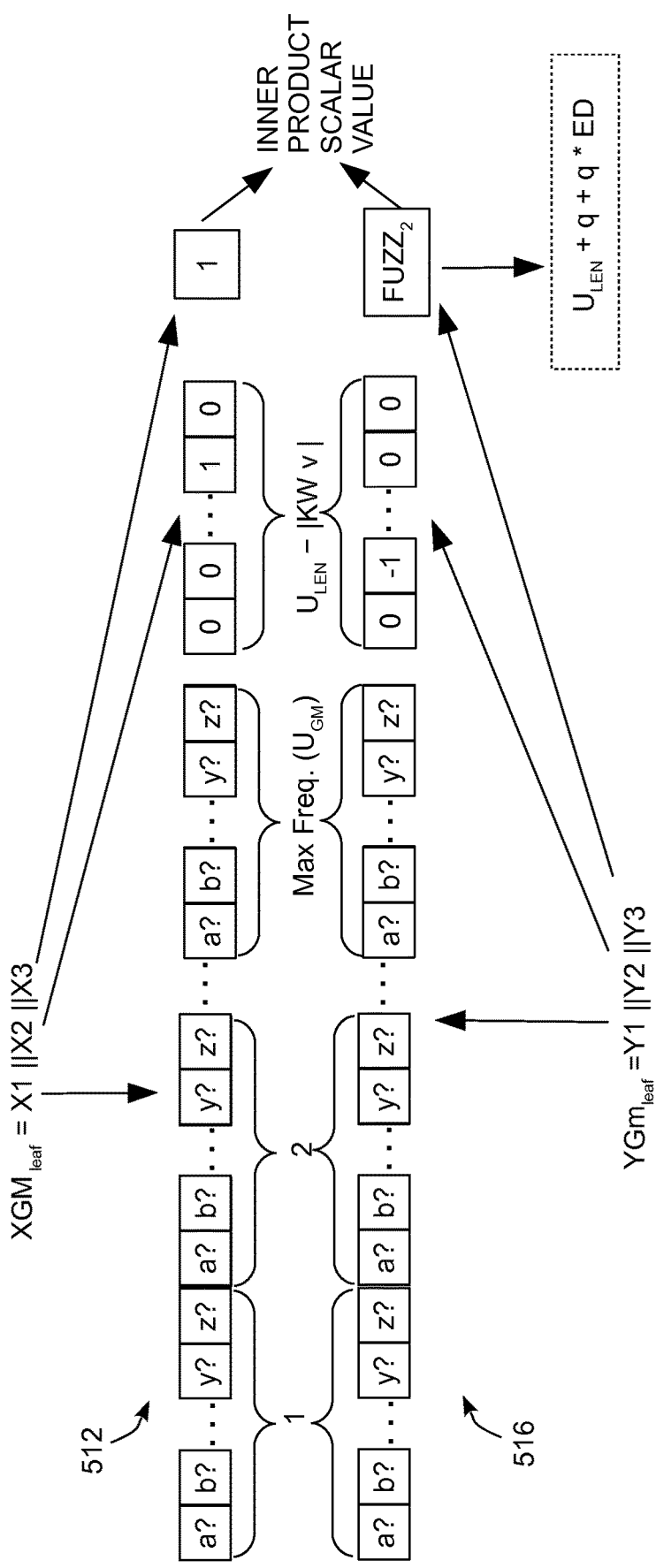
FIG. 5B is an example of vectors used to compare search queries with leaf nodes in a filter tree search index
Figure 5C:
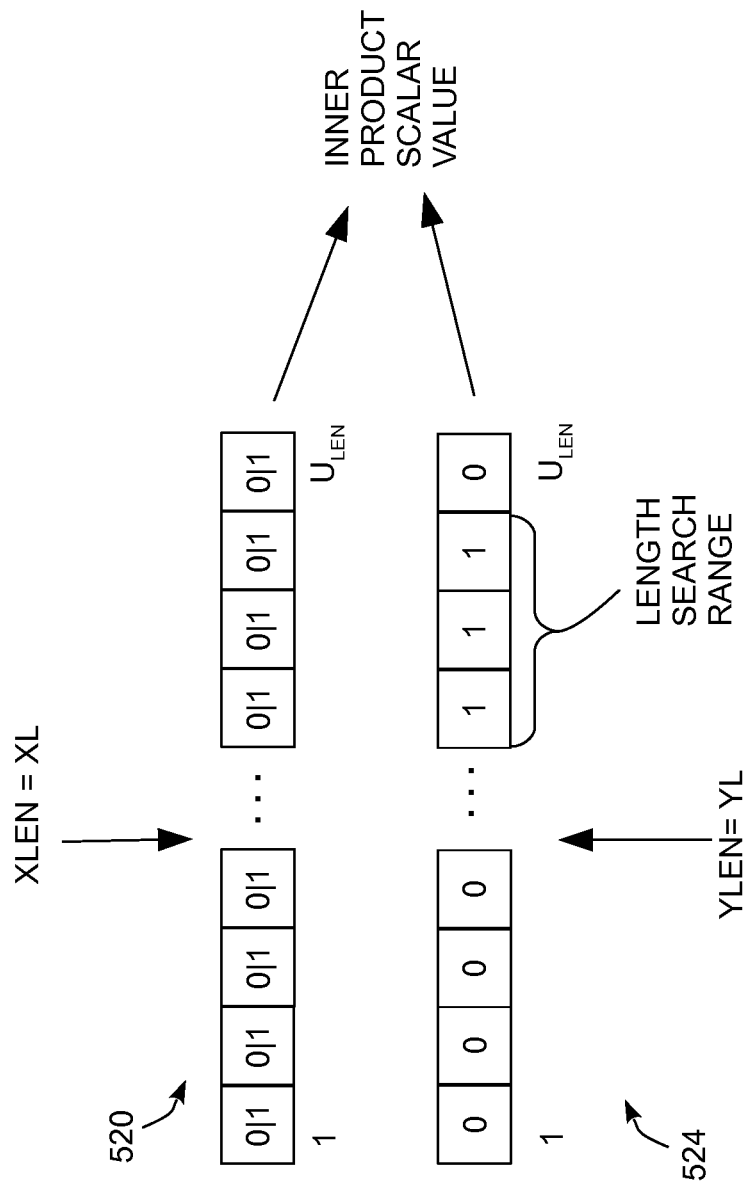
FIG. 5C is an example of vectors used to compare search queries with the lengths of keywords in a filter tree search index

FIG. 4 and FIG. 5A-FIG. 5C depict an encrypted filter search tree structure that the trusted client computing device 104 generates based on the filter tree search index 300 of FIG. 3. FIG. 4 depicts an encrypted filter tree search index 400, also referred to as an "encrypted tree", which corresponds to the filter tree search index 300 from FIG. 3. The encrypted tree 400 includes the same number of nodes and the same node structure as the unencrypted tree 300 of FIG. 3, and each of the nodes 401-407 includes an encrypted representation of the same data elements that are associated with the nodes 301-307, respectively, in the unencrypted filter tree 300. FIG. 5A-FIG. 5C depict the vector structures of the non-leaf and leaf nodes in greater detail.

FIG. 5A depicts a vector 504, labeled $XGM_{non-leaf}$ which stores the GM data for any non-leaf node in a filter tree, such as the non-leaf nodes 405-407 in the encrypted filter tree search index 400. The vector 504 includes two concatenated fields labeled X1 and X2. The field X1 encodes the number of occurrences of each letter that is stored in the non-leaf node. The field X1 is further divided into UGM sets, where UGM is the maximum frequency of occurrence of any q-gram (e.g. letter) in any of the keywords in the filter tree search index. In the examples of FIG. 3 and FIG. 4, UGM=2 because the letters "r" and "l" occur twice in a single keyword while all other letters that are present in the keywords occur only once. Consequently, the field X1 includes a total of 26×2=52 elements for two full sets of symbols in the 26-letter alphabet. The processor 108 in the trusted client computing device 104 sets elements in each subset of the field X1 to a first numeric value (e.g. 1) if the symbol corresponding to the element is present in the GM vector for the node while all the remaining elements are set to a second numeric value (e.g. 0). In the example of FIG. 5A, the vector 504 includes two sets of entries that each correspond to a symbol [a-z] that either occurs once in the first set or entries are present in both the first set and the second set for symbols [a-z] that occur twice up to the maximum number of occurrences $U_{GM}$ for any symbol.

Using node 407 from the tree 400 as an example, there are two entries for both of the letters "l" and "r" in both sets of the field X1 since the non-leaf node 407 includes aggregate data showing keywords ("hello" and "many") that use both of these letters twice ($U_{GM}$=2). The remaining letters ("a", "e", "d", "h", "o", "s", "m", "u", "w", and "y"), are represented in only the first set of the field X1 since each of these symbols occurs at most only once in any single keyword. Setting two different elements to 1 in the vector for the letters "l" and "r" increases the overall weight of these letters in the fuzzy matching inequality operations that are described below compared to the letters that only occur once, and more generally the structure of the vector provides symbols that occur in a keyword more frequently with a higher weight value during a fuzzy matching process. The field X2 is assigned a fixed numeric value of −1, which acts as a multiplier that changes the numeric sign of a fuzziness parameter in a corresponding search token vector 508 ($YGM_{non-leaf}$), which is described in more detail below.

FIG. 5B depicts a vector 512, labeled $XGM_{leaf}$ which stores the GM data for a leaf node in a filter tree, such as the non-leaf nodes 401-404 in the encrypted filter tree search index 400. The vector 504 includes three concatenated fields labeled X1, X2, and X3. The field X1 has the same structure as the field X1 from the vector 504 described above in FIG. 5A, but in a leaf node the field X1 only encodes the occurrences of symbols in the keyword that is stored in a single leaf node. In particular, the number of sets of [a-z] values (2 sets with a total of 52 entries in the example of FIG. 3 and FIG. 4) is the same for all node vectors in the filter trees even if an individual node, such as a leaf node, may encode a keyword that does not have letter occurrences that occupy all of the sets in the field X1, such as in leaf node 401 where the keyword "sum" only includes a single occurrence of each letter in the keyword. The field X2 of the vector 512 includes an encoded value corresponding to a length of the keyword stored in the leaf node (|KWv|) relative to a predetermined maximum keyword length ($U_{LEN}$), where $U_{LEN}$ represents the length of the longest keyword that is stored in the filter tree search index. The field X2 has $U_{LEN}$ entries, that are set to a first value (e.g. 0) with a single entry at $U_{LEN}$−|KWv| being set to a second value (e.g. 1). The third field X3 has a single value (1) that corresponds to a predetermined multiplier corresponding to a second fuzziness parameter in the second query vector 516 of the search token ($YGM_{leaf}$), which is described in more detail below.

FIG. 5C depicts a vector 520, labeled XLEN, which stores the keyword length data in both the non-leaf and leaf nodes of a filter tree, such as each of the nodes 401-407 in the encrypted filter tree search index 400. The XLEN vector includes a single field XL that has $U_{LEN}$ entries where each entry has one of two values (e.g. 0 and 1) to indicate if the node encodes a keyword with a given length (1) or not (0). In the filter tree search indexes of FIG. 3 and FIG. 4, the XLEN vector has a total of five (5) elements since the longest keywords have five entries. For non-leaf nodes, the XLEN vector encodes lengths of each keyword in a child node (e.g. the vector is [0,0,1,0,1] for the root node 407 in the filter tree 400 for keyword lengths of 3 and 5). For leaf nodes, the XLEN vector encodes the length of the keyword stored in the leaf node. Note that in some situations the XLEN vectors include entries for keyword lengths that may not correspond to any of the keywords, such as a keyword length of 4 that does not match any keyword in the filter tree.

FIG. 5A-FIG. 5C depict the plaintext contents of the GM and LEN vectors that are formed in the non-leaf and leaf nodes of the filter search tree 400 for illustrative purposes. During the process 200, the trusted client computing device 104 encrypts the vectors in the filter search tree and the keywords that are stored in the leaf nodes and transmits the encrypted filter tree search index to the untrusted server 154 to prevent the untrusted server 154 from being able to determine the plaintext contents or the lengths of the keywords (block 212). The trusted client computing device 104 uses a standard symmetric encryption algorithm such as AES with a symmetric encryption key to encrypt the contents of the keywords that are stored in the leaf nodes and, in some embodiments, a set of file identifiers for encrypted files that contain each of the keywords. The master key mk used in the function-hiding inner product encryption process described herein is, at least in some embodiments, also suitable for use with the standard symmetric encryption scheme to encrypt the keywords and files, although in many practical embodiments the trusted client 104 generates one or more separate symmetric keys to encrypt and decrypt the keyword and file data. The trusted client 104 stores the separate symmetric keys 128 in the memory 120. The encrypted contents of the keywords themselves are returned to the trusted client computing device 104 as results of the fuzzy search process, but the untrusted server 154 uses the encrypted filter tree search index to perform the fuzzy search instead of using the encrypted keyword data directly in the search process.

The trusted client computing device 104 encrypts the vectors within the filter tree using a function-hiding Inner product encryption (IPE) process that is generally known to the art and is explained here in the context of the process 200. To encrypt the search index vectors, the trusted client computing device uses the master key mk to generate a sub-key for the X vectors skx←GenKey(mk, X). The sub-key is tied to the contents of each plaintext vector, so the trusted client computing device 104 generates a different sub-key for each vector (GM and LEN) that is associated with a node in the filter tree. By taking as input the master key mk and each of the non-leaf vector $XGM_{non-leaf}$, leaf node vectors $XGM_{leaf}$, or the length vector XLEN, this algorithm outputs a functional secret key skx. The functional secret key skx is the encrypted representation of a vector that still enables the untrusted server to perform specific inner product operations using encrypted vector data for another vector in the search token Y ($ct_Y$), the encrypted vector data $sk_X$ corresponding to the vector in the encrypted filter tree, and the public system parameter data param that the client generates with the master key mk as described above using the following function that is performed by the untrusted server computing device 154: z←Dec(param, $sk_X$, $ct_Y$). The value of z is numerically equivalent to an inner product of the original unencrypted vectors (z=<X, Y>) where in at least one embodiment the "inner product" is the scalar numeric value output of the dot product operation performed between two vectors of equal length (e.g. for two vectors X and Y each having five elements: $z=X_1Y_1+X_2Y_2+X_3Y_3+X_4Y_4+X_5Y_5$). The function-hiding inner product encryption operation enables the untrusted server 154 to generate the value z using only param, $sk_X$, $ct_Y$ as inputs, and the function-hiding inner product encryption process does not reveal the plaintext contents of any elements in the original X and Y vectors. As described in further detail below, the structure of the encrypted filter tree search index and the encrypted search tokens enables the untrusted server computing device 154 to perform the inner product encrypted operations to generate the scalar values that are equivalent to inequality operations that compare the contents of the search token to the contents of the encrypted filter search tree.

The trusted client computing device 104 transmits the encrypted filter tree data including the encrypted vectors for each of the nodes in the encrypted filter tree, the encrypted keywords, and optionally the public system parameter data to the untrusted server computing device 154 using the data network 140. The untrusted server computing device 154 stores the encrypted filter tree search index data 174 in the memory 170 to perform fuzzy searches in response to subsequent search query tokens that the trusted client computing device 104 transmits to the untrusted server computing device 154. In some embodiments, the trusted client computing device 104 also transmits the public system parameter data param to the untrusted server computing device 154 and the untrusted server computing device stores the param data 180 in the memory 170 for use in subsequent fuzzy search operations. In some embodiments, the trusted client computing device 104 also transmits encrypted files to the untrusted server computing device 154 that are stored with the encrypted files 178 in the memory 170.

Process 200 continues as the trusted client computing device 104 generates an encrypted search token and transmits the encrypted search token to the untrusted server computing device 154 (block 216). The encrypted search token includes the information that is encoded for a fuzzy keyword search query that the trusted client computing device 104 performs to search for keywords that are stored in the encrypted filter tree search index data 174 in the untrusted server 154. The trusted client 104 starts with an input search keyword that may, but often does not, exactly match one of the keywords stored in the encrypted filter tree search index. As depicted in FIG. 5A-FIG. 5C, the trusted client computing device 104 generates a set of vectors $YGM_{non-leaf}$, $YGM_{leaf}$, and YLEN that are encrypted and used to search the encrypted filter search tree in the untrusted server 154.

Referring to FIG. 5A, the vector 508, labeled $YGM_{non-leaf}$, includes concatenated fields Y1 and Y2. Y1 is a field corresponding to occurrences of symbols in the search keyword, and is encoded using the same number of entries (e.g. 2×26=52 entries for the embodiments of FIG. 3 and FIG. 4) as the field X1 that is described above regarding the vector 504. The trusted client 104 generates the field Y1 based on the occurrences symbols (letters) in the search keyword. The vectors $XGM_{non-leaf}$ and $YGM_{non-leaf}$ both include the same number of elements.

The trusted client 104 generates the second field Y2 in the vector 508 using a first fuzziness parameter $FUZZ_1$. The first fuzziness parameter is numerically defined as: |w|−q−

(q·ED) where |w| is the length of the search keyword, q is the q-gram used for the filter tree (e.g. q=1 in the examples used herein), and ED is a numeric edit distance value that is a numeric parameter that adjusts the breadth or "fuzziness" of the search. In more detail, ED is a numeric quantity that affects the results of inequality comparisons when performing a fuzzy search. In general, a larger numeric ED value increases the scope of the fuzzy search since a greater number of nodes in the filter tree search index meet a predetermined similarity threshold between the vector in the search token and the vector in the node of the filter tree in the fuzzy search while a smaller ED value decreases the scope of the fuzzy search since fewer nodes in the filter tree search index meet the predetermined similarity threshold between the vector in the search token and the vector in the node of the filter tree.

Referring to FIG. 5B, the vector 516, labeled $YGM_{leaf}$ includes concatenated fields Y1, Y2, and Y3. Y1 is a field corresponding to occurrences of symbols in the search keyword, and is encoded using the same number of entries (e.g. 2×26=52 entries for the embodiments of FIG. 3 and FIG. 4) as in the fields X1 and Y1 that is described above regarding the vectors 504 and 508, respectively. The field Y2 corresponds to the field X2 in the vector 512. Y2 includes a field of $U_{LEN}$ elements that are each set to a first value (e.g. 0) except for a single element corresponding to a length of the search keyword relative to a predetermined maximum keyword length ($U_{LEN}$−|KWv|), where |KWv| is the length of the search keyword) that receives the predetermined numeric value of −1 (instead of +1 used in the corresponding field X2 of the vector 512). The field Y3 is a second fuzziness parameter $FUZZ_2$ that has the numeric value $U_{LEN}$+q+(q·ED). The embodiments described herein use a single edit distance parameter ED to perform comparisons with the non-leaf nodes and the leaf nodes, although alternative embodiments can use different edit distances to traverse the non-leaf nodes of the filter tree search index and perform the final fuzzy comparisons at the leaf nodes. Because the edit distance and the fuzziness parameter data are only included in the search token and are not statically encoded into the structure of the encrypted filter tree data 174, the system 100 can perform the process 200 using different fuzziness parameters in different search queries. The vectors $XGM_{leaf}$ and $YGM_{leaf}$ both include the same number of elements.

Referring to FIG. 5C, the vector 524, labeled YLEN, is a length matching vector for the search token that includes $U_{LEN}$ elements where each element corresponds to one keyword length in the range 1 to $U_{LEN}$. The trusted computing device 104 sets an element in the vector 524 that corresponds to the exact length of the search keyword, and optionally other keyword lengths, to "1" to match keywords in the encrypted filter tree search index that have the lengths specified in YLEN. The length vector YLEN does not have an explicit fuzziness parameter, but the trusted client computing device 104 can increase or decrease the fuzziness level of length matching between the keyword length of the search keyword and keywords that are stored in the encrypted filter tree search index 174 by setting multiple values in the length vector YLEN to 1 in addition to an exact-match corresponding to the exact length of the search keyword. For example, in FIG. 5C the vector 524 has three elements set to 1 to enable the vector 524 to match three different keyword lengths. The vectors XLEN and YLEN both include the same number of elements.

To encrypt the search token, the trusted client computing device uses the master key mk to encrypt each of the vectors $YGM_{non-leaf}$, $YGM_{leaf}$, and YLEN separately: $Ct_{y_{non-leaf}} \leftarrow$ Enc (mk, $YGM_{non-leaf}$), $ct_{yleaf} \leftarrow$ Enc (mk, $YGM_{leaf}$), $ct_{ylen} \leftarrow$ Enc (mk, YLEN), where the encrypted search token includes $ct_{y1}$ and $ct_{y2}$. The encrypted vector data $ct_{y3}$ is included in embodiments of the process 200 that also use keyword length comparisons in the fuzzy search process. The trusted client computing device 104 transmits the encrypted search token including the encrypted first query vector $YGM_{non-leaf}$ including encrypted data corresponding to occurrences of symbols in the search keyword and encrypted data corresponding to a first fuzziness parameter, and the encrypted second query vector $YGM_{leaf}$ including encrypted data corresponding to the occurrences of symbols in the search keyword, encrypted data corresponding to a length of the search keyword relative to a predetermined maximum keyword length, and encrypted data corresponding to a second fuzziness parameter to the untrusted server computing device 154. In embodiments of the process 200 that also perform keyword length comparisons as part of the fuzzy search, the trusted client computing device 104 also transmits the encrypted search token including the encrypted third query vector YLEN including encrypted data corresponding to at least one length of keywords in a search range that correspond to a length of the search keyword to the untrusted server computing device 154. In some embodiment, the trusted client computing device 104 includes the public system parameter data param in the search token for embodiments in which the untrusted server 154 does not store param in the memory 170 at the time of generation of the encrypted filter tree search index 174.

Process 200 continues as the untrusted server computing device 154 receives the search token corresponding to the search keyword from the trusted client computing device 104 with the search token including encrypted vector data $ct_{y_{non-leaf}}$, $Ct_{yleaf}$, and $ct_{ylen}$ corresponding to vectors $YGM_{non-leaf}$, $YGM_{leaf}$, and YLEN, respectively. The untrusted server 154 uses the encrypted search token data and the encrypted filter tree search index 174, to traverse non-leaf nodes in the encrypted filter tree search index 174 (block 220). The processor 158 in the untrusted server computing device 154 retrieves a non-leaf node in the encrypted filter tree search index 174, typically starting from the root node (node 407 in FIG. 4). As described above, the non-leaf node vector node includes encrypted data $sk_{x\_non-leaf}$ for the vector $XGM_{non-leaf}$ corresponding to occurrences of symbols in all child nodes of the non-leaf node in the encrypted tree and encrypted data corresponding to a predetermined multiplier corresponding to the first fuzziness parameter in the first query vector $YGM_{non-leaf}$.

To perform the fuzzy search with the non-leaf node data and the search token, the processor 158 in the untrusted server computing device generates a first inner product value based on a function-hiding inner product encryption operation of the first query vector and the first non-leaf node vector. As described above, the processor 158 generates $z \leftarrow$ Dec(param, $Sk_{Xnon-leaf}$, $Ct_{Ynon-leaf}$) using the function-hiding IPE operation with the inputs being the public system parameter data param, the encrypted GM vector data for the non-leaf node $sk_{Xnon-leaf}$ and the encrypted vector data from the search token $Ct_{Ynon-leaf}$. The result z is the inner product value, which is simply a numeric value that corresponds to the numeric dot product of the original unencrypted vectors $XGM_{non-leaf} \cdot YGM_{non-leaf}$. The function-hiding inner product encryption in the fuzzy search does not reveal any of the plaintext data from the original vectors, including the plaintext contents for any of the keyword stored in the leaf node, the search keyword, the first fuzziness parameter, or the second fuzziness parameter (used in the subsequent leaf node comparisons), to the untrusted server 154 even though the untrusted server 154 still generates the same inner product value z that would be generated from the dot product of the original plaintext vectors.

The processor 158 compares the inner product value z to a first predetermined similarity threshold corresponding to a similarity of the first query vector to the first non-leaf node vector. In the embodiment of the system 100 and the process 200, the first predetermined similarity threshold is simply a numeric zero (0) value and any value of z that is >0 (or alternatively ≥0 in a less-strict configuration) exceeds the predetermined similarity threshold. However, in alternative embodiments the numeric value of the similarity threshold can be a value other than 0 and those of skill in the art will recognize that "exceeding" the threshold in some configurations could mean producing a value that numerically smaller than the threshold value instead of larger.

In more detail, the function-hiding IPE calculation and equivalent dot-product operation that produce z performs an operation that is equivalent to the following inequality that is used for fuzzy searching: $|GM_{non-leaf} \cap GM_{query}(wq, q)| - (|wq|-q+1-q \cdot ED) > 0$ (although ≥0 could be used in in a less-strict configuration), where wq is the search keyword in the query and q=1 for the 1-gram examples depicted herein. As can be seen in FIG. 5A and the preceding inequality, all of values in the search are fixed as either part of the encrypted tree or the encrypted search token with the exception of the edit distance ED, which the trusted client computing device 104 can select to adjust the first fuzziness parameter for each encrypted fuzzy search query. The effect of ED is to increase the result value on the left hand side of the inequality. Larger values of ED mean that more dissimilar filter tree and search query vectors can still be combined to generate a z value where z>0 (although z≥0 could be used in in a less-strict configuration), while smaller values of ED only return results for non-leaf nodes that correspond to keywords having higher similarity levels to the search keyword.

The function-hiding inner product encryption operation of the GM vectors identifies similarities based on the symbol contents of keywords that are encoded in the non-leaf node and the search token itself. In the embodiment of FIG. 2, the processor 158 in the untrusted server computing device 154 also performs function-hiding inner product encryption operation that returns a result corresponding to the similarity between the encrypted length vectors for the non-leaf node and the search token: $z \leftarrow Dec(param, Sk_{Xlen}, Ct_{Ylen})$. Once again, the function-hiding inner product encryption operation does not reveal the lengths of keywords stored in the filter tree search index or the keywords in the search token to the untrusted server 154. If the result is not equal to 0, which indicates that at least two elements in the original length vectors XLEN and YLEN are both set to 1 and that at least one keyword length in the node corresponds to a keyword length specified in the search token vector YLEN, then the processor 108 identifies that the length vector of the non-leaf node satisfies a similarity measurement with the search token. The result z for the encrypted vectors $sk_{Xlen}$ and $ct_{ylen}$ corresponds to the mathematical inequality $|LEN_{non-leaf} \cap LEN_{search\_token}| > 0$ (although in alternative embodiments that use negative numbers the result could be a negative non-zero number). Some embodiments of the process 200 optionally omit the comparison of keyword lengths from the fuzzy search operation.

During the process 200, the processor 158 in the untrusted server computing device traverses from the non-leaf node to a child non-leaf node (e.g. traversing from node 407 to one of nodes 405 and 406 or from a non-leaf node to a leaf node) in response to both of the GM and LEN function-hiding inner product encryption operations returning results that exceed the predetermined similarity thresholds (e.g. $z \leftarrow Dec(param, Sk_{Xnon-leaf}, Ct_{Ynon-leaf}) > 0$ and $z \leftarrow Dec(param, Sk_{Xlen}, ct_{Ylen}) > 0$). If either of the function-hiding inner product encryption operations produces a result that does not exceed the threshold, then the processor 158 does not traverse to any additional child nodes (either leaf or non-leaf) from the non-leaf node, which enables efficient operation of the untrusted server computing device 154 to avoid processing child nodes that will also fail to match the fuzzy search. In some embodiments, the server computing device 154 traverses from the parent non-leaf nodes to child nodes in parallel (e.g. traversing from root node 407 to both of child nodes 405 and 405 in parallel) to improve the speed of operation of fuzzy search process since there are no data dependencies between sibling nodes.

Process 200 continues as the untrusted server computing device 154 traverses the encrypted filter tree search index 174 until potentially reaching one or more leaf nodes in the tree (block 224). If the server 154 does not reach any leaf nodes because all of the non-leaf nodes fail to exceed the similarity threshold for the fuzzy search, then the untrusted server 154 returns an empty (ø) search result to the trusted client computing device (block 240).

If the untrusted server computing device 154 reaches at least one leaf node during the process 200, then the process 200 continues with the leaf node (block 228). The processor 158 retrieves the leaf node of the encrypted tree that is connected to parent non-leaf node in the encrypted tree search index 174 in the memory 170 in response to the inner product value z for the parent non-leaf node exceeding the first predetermined similarity threshold. To perform the fuzzy search with the leaf node data and the search token, the processor 158 in the untrusted server computing device 154 generates a second inner product value based on a function-hiding inner product encryption operation of the second query vector $ct_{yleaf}$ and the corresponding encrypted leaf node vector data $Sk_{Xleaf}$. As described above, the processor 158 generates $z \leftarrow Dec(param, sk_{Xleaf}, ct_{Yleaf})$ using the function-hiding IPE operation with the inputs being the public system parameter data param, the encrypted GM vector data for the leaf node $Sk_{Xleaf}$ and the encrypted vector data from the search token $ct_{Yleaf}$. The result z is the second inner product value, which is simply a numeric value that corresponds to the numeric dot product of the original unencrypted vectors $XGM_{leaf} \cdot YGM_{leaf}$. The function-hiding inner product encryption in the fuzzy search does not reveal any of the plaintext data from the original vectors, including the plaintext contents for any of the keyword stored in the leaf node, the search keyword, and the second fuzziness parameter, to the untrusted server 154 even though the untrusted server 154 still generates the same inner product value z that would be generated from the dot product of the original plaintext vectors.

The processor 158 compares the second inner product value z to a second predetermined similarity threshold corresponding to a similarity of the second query vector to the first leaf node vector. In the embodiment of the system 100 and the process 200, the second predetermined similarity threshold is also a numeric zero (0) value and any value of z that is >0 (or alternatively ≥0 in a less-strict configuration) exceeds the predetermined similarity threshold. However, in alternative embodiments the numeric value of the similarity threshold can be a value other than 0 and those of skill in the art will recognize that "exceeding" the threshold in some configurations could mean producing a value that numerically smaller than the threshold value instead of larger. Additionally, the first and second predetermined similarity thresholds used for the non-leaf and leaf node comparisons, respectively, do not have to be equal to each other.

In more detail, the function-hiding IPE calculation and equivalent dot-product operation that produce z performs an operation that is equivalent to the following inequality that is used for fuzzy searching: $|GM_{leaf} \cap GM_{query}(wq, q)| - (\max(|wq|,|KWv|) - q + 1 - q \cdot ED) > 0$ (although $\geq 0$ could be used in in a less-strict configuration), where wq is the search keyword in the query, $KW_v$ is the encrypted keyword stored in the leaf node, and q=1 for the 1-gram examples depicted herein. As can be seen in FIG. 5B and the preceding inequality, all of values in the search are fixed as either part of the encrypted tree or the encrypted search token with the exception of the edit distance ED, which the trusted client computing device 104 can select to adjust the second fuzziness parameter for each encrypted fuzzy search query. The effect of ED is to increase the result value on the left hand side of the inequality. Larger values of ED mean that more dissimilar filter tree and search query vectors can still be combined to generate a z value where z>0 (or z≥0 in a less-strict embodiment), while smaller values of ED only return results for non-leaf nodes that correspond to keywords having higher similarity levels to the search keyword.

As with the non-leaf nodes, in the embodiment of FIG. 2, the processor 158 in the untrusted server computing device 154 also performs function-hiding inner product encryption operation that returns a result corresponding to the similarity between the encrypted length vector for the leaf node, which corresponds to the length of the encrypted keyword that is stored with the leaf node, and the search token: $z \leftarrow Dec(param, sk_{Xlen}, ct_{Ylen})$ Once again, the function-hiding inner product encryption operation does not reveal the lengths of the keyword stored in the leaf node of the encrypted filter tree search index or the keywords in the search token to the untrusted server 154. If the result is not equal to 0, then the length of the keyword stored in the leaf node matches the size criteria in the encrypted vector of the search token.

During the process 200 the processor 158 in the untrusted server computing device 154 performs the operations described above for any leaf nodes that are reached from non-leaf nodes during the process 200. The processor 158 identifies that the encrypted keyword stored in a leaf node matches the fuzzy search if the GM and LEN function-hiding inner product encryption operations returning results that exceed the predetermined similarity thresholds (e.g. $z \leftarrow Dec(param, sk_{Xleaf}, ct_{Yleaf}) < 0$ and $z \leftarrow Dec(param, sk_{Xlen}, ct_{Ylen}) > 0$) for the leaf node. The process 200 does not reveal the contents of the encrypted keyword data to the untrusted server computing device 154. Once again, in alternative embodiments the fuzzy search process may omit the comparison between the search range lengths of the search token and the length of the encrypted keyword.

Process 200 continues as the processor 158 identifies if any of the leaf nodes exceeds the predetermined similarity threshold for GM function-hiding inner product operation ($z \leftarrow Dec(param, sk_{Xleaf}, ct_{Yleaf}) > 0$) the LEN function-hiding inner product operation ($z \leftarrow Dec(param, Sk_{Xlen}, ct_{Ylen}) > 0$) (block 232). If none of the leaf nodes exceed the similarity thresholds for the fuzzy search, then the untrusted server 154 returns an empty (ø) search result to the trusted client computing device (block 240).

If, however, one or more of the leaf nodes exceed the similarity thresholds, then the untrusted server computing device 154 transmits the encrypted keyword stored in the leaf node to the client computing device 104 in response to the second inner product value exceeding a second predetermined similarity threshold corresponding to a similarity of the second query vector to the first leaf node vector (block 236). The trusted client computing device 104 uses a symmetric key 128 to decrypt one or more encrypted keywords that the untrusted server computing device 154 transmits as part of the fuzzy search query results. The client computing device 104 can, for example, generate an output of the decrypted keywords that were identified in the fuzzy search using the I/O devices 112 or perform additional processing to retrieve and decrypt encrypted files 178 that contain keywords in the fuzzy search results.

As described above, the leaves of the filter trees 300 and 400 store keyword data as plaintext (tree 300) or as ciphertext (tree 400). In some embodiments, the leaves of the filter trees also store file identifier data for encrypted files 178 that are stored in the untrusted server 154 or on another untrusted server computing device that contain the keyword for particular leaf node. In some embodiments, the file identifiers are stored in a constant size data structure (e.g. a padded data structure) that prevents the untrusted server 154 from being able to determine how many files match a given keyword based on the size the of the encrypted keyword and file identifier data structure. Thus, in some embodiments the untrusted server not only returns keywords that match the fuzzy search token, but the returned information also includes the identifiers for one or more encrypted data files 178 that include the keyword results from the fuzzy search. The client computing device 104 optionally retrieves and decrypts the encrypted files that include the keywords that are returned in the results of the fuzzy search.

In another embodiment, the untrusted server 154 includes a separate static or dynamic symmetric searchable encryption (SSE) search index that includes encrypted entries corresponding to the exact keywords that the trusted client 104 receives as the result of the FSSE search. The separate SSE search index is otherwise known to the art and is not described in further detail herein. The trusted client 104 then performs an additional exact-result search using the keyword results from the fuzzy search to identify and optionally retrieve encrypted files that include the keyword results of the fuzzy search.

As described above, the system 100 and the process 200 provide improvements to the operation of computing devices. A non-limiting list of improvements that are embodied herein enable computing devices to perform secure fuzzy searching operations in encrypted data both in a manner that prevents the untrusted server from obtaining information about plaintext data stored in the filter tree search index, to perform the fuzzy searches in a computationally efficient manner, and to enable fuzzy searching in which the trusted client computing device can adjust the fuzziness parameter of the search dynamically between searches without requiring the encrypted search index to be modified to accommodate fuzzy searches with different fuzzy search parameters. In addition, for the search operation, the communication overhead is linear to the number of encrypted candidate keywords, which is a constant number (less than 50) as demonstrated by our implementation. Furthermore, the search complexity varies depending on the traversal path of the filter tree encrypted search index (FTree) with respect to different queried keywords. Additional properties of the computation and communication and storage complexity of the embodiments described herein are set forth below where m represents the number of keywords stored in the encrypted filter tree search index and |ct| is the size of ciphertexts that are generated by IPE.Enc (e.g. the lengths of the encrypted GM and LEN vectors along with corresponding encrypted search vectors described above), and |Candidates| is the size of the candidate list:

|  | Computation Complexity | Communication/Storage Complexity |
|---|---|---|
| BuildIndex | O(m)IPE.Enc | O(m)|ct| |
| GenToken | 3IPE.GenKey | 3|ct| |
| Search | # of traversed nodes in Ftree | |Candidates| |

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed herein in the following claims.

What is claimed:

1. A method for performing a fuzzy search in encrypted data comprising:
   receiving, with an untrusted server computing device, a search token corresponding to a search keyword from a client computing device, the search token further comprising:
      a first query vector including encrypted data corresponding to occurrences of symbols in the search keyword and encrypted data corresponding to a first fuzziness parameter; and
      a second query vector including encrypted data corresponding to the occurrences of symbols in the search keyword, encrypted data corresponding to a length of the search keyword relative to a predetermined maximum keyword length, and encrypted data corresponding to a second fuzziness parameter;
   retrieving, with a processor in the untrusted server computing device, a non-leaf node in an encrypted tree stored in a memory of the untrusted server computing device, the non-leaf node comprising:
      a first non-leaf node vector including encrypted data corresponding to occurrences of symbols in all child nodes of the non-leaf node in the encrypted tree and encrypted data corresponding to a predetermined multiplier corresponding to the first fuzziness parameter in the first query vector;
   generating, with the processor in the untrusted server computing device, a first inner product value based on a function-hiding inner product encryption operation of the first query vector and the first non-leaf node vector;
   retrieving, with the processor in the untrusted server computing device, a leaf node of the encrypted tree that is connected to the non-leaf node in the encrypted tree in the memory in response to the first inner product value exceeding a first predetermined similarity threshold corresponding to a similarity of the first query vector to the first non-leaf node vector, the leaf node including:
      an encrypted keyword stored in the leaf node; and
      a first leaf node vector including encrypted data corresponding to occurrences of symbols in the keyword stored in the leaf node, encrypted data corresponding to a length of the keyword stored in the leaf node relative to a predetermined maximum keyword length, and encrypted data corresponding to a predetermined multiplier corresponding to the second fuzziness parameter in the second query vector;
   generating, with the processor in the untrusted server computing device, a second inner product value using the function-hiding inner product encryption operation of the second query vector and the first leaf node vector; and
   transmitting, with the untrusted server computing device, the encrypted keyword stored in the leaf node to the client computing device in response to the second inner product value exceeding a second predetermined similarity threshold corresponding to a similarity of the second query vector to the first leaf node vector, the fuzzy search not revealing plaintext contents for any of the keyword stored in the leaf node, the search keyword, the first fuzziness parameter, or the second fuzziness parameter.

2. The method of claim 1, the search token received from the client computing device further comprising:
   a third query vector including encrypted data corresponding to at least one length of a keyword in a search range that corresponds to a length of the search keyword; and
   the non-leaf node retrieved with the processor in the untrusted server computing device further comprising:
      a second non-leaf node vector including encrypted data corresponding to lengths of keywords stored in all child nodes of the non-leaf node in the encrypted tree; and
   the method further comprising:
      generating, with the processor in the untrusted server computing device, a third inner product value based on a function-hiding inner product encryption operation of the third query vector and the second non-leaf node vector; and
      retrieving, with the processor, the leaf node of the encrypted tree that is connected to the non-leaf node in the encrypted tree in the memory in response to the first inner product value exceeding the predetermined similarity threshold and the third inner product value being not equal to zero.

3. The method of claim 1 further comprising:
   generating, with the processor in the untrusted server computing device, the first inner product value and the second inner product value using public system parameter data that correspond to an encryption key that the client computing device used to generate the encrypted data in the first query vector and the second query vector.

4. The method of claim 3 wherein the public system parameter data are stored in the memory of the untrusted server computing device.

5. The method of claim 3 wherein the public system parameter data are included in the search token received from the client computing device.

6. The method of claim 3, the generating of the first inner product value further comprising:
   generating, with the processor in the untrusted server computing device using the function-hiding inner product encryption operation and the public system parameter data, the first inner product value that is equivalent to a numeric value of a dot product of plaintext contents of the first query vector and plaintext contents of the first non-leaf vector, wherein the function-hiding inner product encryption operation does not reveal plaintext contents of the first query vector and the first non-leaf node vector to the untrusted server computing device.

7. The method of claim 1 wherein the first fuzziness parameter corresponds to:

$$|w|-q-q\text{-}ED$$

where |w| is a length of the search keyword, q is a predetermined q-gram number used to form the encrypted tree, and ED is a numeric edit distance quantity generated by the client computing device as part of the search token; and the second fuzziness parameter corresponds to $U_{LEN}+q+q*ED$ where $U_{LEN}$ is the predetermined maximum keyword length.

8. The method of claim 1 wherein the first predetermined similarity threshold and the second predetermined similarity threshold are both zero, the first inner product value exceeding the first predetermined similarity threshold in response to the first inner product value having a positive numeric value, and the second inner product value exceeding the second predetermined similarity threshold in response to the second inner product value having a positive numeric value.

9. A method for performing a fuzzy search in encrypted data comprising:
receiving with an untrusted server computing device a search token corresponding to a search keyword from a client computing device, the search token further comprising:
a first query vector including encrypted data corresponding to the occurrences of symbols in the search keyword, encrypted data corresponding to a length of the search keyword relative to a predetermined maximum keyword length, and encrypted data corresponding to a fuzziness parameter;
retrieving, with the processor, a leaf node of an encrypted tree stored in a memory of the untrusted server computing device, the leaf node including:
an encrypted keyword stored in the leaf node; and
a first leaf node vector including encrypted data corresponding to occurrences of symbols in the keyword stored in the leaf node, encrypted data corresponding to a length of the keyword stored in the leaf node relative to a predetermined maximum keyword length, and encrypted data corresponding to a predetermined multiplier corresponding to the second fuzziness parameter in the first query vector;
generating, with the processor in the untrusted server computing device, a first inner product value using a function-hiding inner product encryption operation of the first query vector and the first leaf node vector; and
transmitting, with the untrusted server computing device, the encrypted keyword stored in the leaf node to the client computing device in response to the first inner product value exceeding a first predetermined similarity threshold corresponding to a similarity of the first query vector to the leaf node vector, the fuzzy search not revealing plaintext contents for any of the keyword stored in the leaf node, the search keyword, or the fuzziness parameter.

10. The method of claim 9, the search token received from the client computing device further comprising:

a second query vector including encrypted data corresponding to at least one length of a keyword in a search range that corresponds to a length of the search keyword; and
the leaf node retrieved with the processor in the untrusted server computing device further comprising:
a second leaf node vector including encrypted data corresponding to a length of the encrypted keyword stored in the leaf node; and
the method further comprising:
generating, with the processor in the untrusted server computing device, a second inner product value based on a function-hiding inner product encryption operation of the second query vector and the second leaf node vector; and
transmitting, with the processor, the encrypted keyword stored in the leaf node to the client computing device in response to the first inner product value exceeding the first predetermined similarity threshold and the second inner product value being not equal to zero.

11. An untrusted computing device configured to perform fuzzy searches in encrypted data comprising:
a network interface device configured to transmit and receive data from a trusted client computing device using a data network;
a memory configured to store an encrypted tree stored comprising at least one non-leaf node and at least one leaf note; and
a processor operatively connected to the network interface device and the memory, the processor being configured to:
receive a search token corresponding to a search keyword from the trusted client computing device, the search token further comprising:
a first query vector including encrypted data corresponding to occurrences of symbols in the search keyword and encrypted data corresponding to a first fuzziness parameter; and
a second query vector including encrypted data corresponding to the occurrences of symbols in the search keyword, encrypted data corresponding to a length of the search keyword relative to a predetermined maximum keyword length, and encrypted data corresponding to a second fuzziness parameter;
retrieve a non-leaf node in the encrypted tree stored in the memory, the non-leaf node comprising:
a first non-leaf node vector including encrypted data corresponding to occurrences of symbols in all child nodes of the non-leaf node in the encrypted tree and encrypted data corresponding to a predetermined multiplier corresponding to the first fuzziness parameter in the first query vector;
generate a first inner product value based on a function-hiding inner product encryption operation of the first query vector and the first non-leaf node vector;
retrieve a leaf node of the encrypted tree that is connected to the non-leaf node in the encrypted tree in the memory in response to the first inner product value exceeding a first predetermined similarity threshold corresponding to a similarity of the first query vector to the first non-leaf node vector, the leaf node including:
an encrypted keyword stored in the leaf node; and
a first leaf node vector including encrypted data corresponding to occurrences of symbols in the keyword stored in the leaf node, encrypted data corresponding to a length of the keyword stored in the leaf node relative to a predetermined maximum keyword length, and encrypted data corresponding to a predetermined multiplier corresponding to the second fuzziness parameter in the second query vector;

generate a second inner product value using the function-hiding inner product encryption operation of the second query vector and the first leaf node vector; and transmit the encrypted keyword stored in the leaf node to the client computing device in response to the second inner product value exceeding a second predetermined similarity threshold corresponding to a similarity of the second query vector to the first leaf node vector, the fuzzy search not revealing plaintext contents for any of the keyword stored in the leaf node, the search keyword, the first fuzziness parameter, or the second fuzziness parameter.

12. The untrusted computing device of claim 11, the processor being further configured to:

receive the search token received from the trusted client computing device further comprising:
a third query vector including encrypted data corresponding to at least one length of a keyword in a search range that corresponds to a length of the search keyword;

retrieve the non-leaf node further comprising:
a second non-leaf node vector including encrypted data corresponding to lengths of keywords stored in all child nodes of the non-leaf node in the encrypted tree;

generate a third inner product value based on a function-hiding inner product encryption operation of the third query vector and the second non-leaf node vector; and retrieve the leaf node of the encrypted tree that is connected to the non-leaf node in the encrypted tree in the memory in response to the first inner product value exceeding the predetermined similarity threshold and the third inner product value being not equal to zero.

13. The untrusted computing device of claim 11, the processor being further configured to:

generate the first inner product value and the second inner product value using public system parameter data that correspond to an encryption key that the client computing device used to generate the encrypted data in the first query vector and the second query vector.

14. The untrusted computing device of claim 13 wherein the public system parameter data are stored in the memory of the untrusted server computing device.

15. The untrusted computing device of claim 13 wherein the public system parameter data are included in the search token received from the client computing device.

16. The untrusted computing device of claim 13, the processor being further configured to:

generate the first inner product value that is equivalent to a numeric value of a dot product of plaintext contents of the first query vector and plaintext contents of the first non-leaf vector using the function-hiding inner product encryption operation and the public system parameter data, wherein the function-hiding inner product encryption operation does not reveal plaintext contents of the first query vector and the first non-leaf node vector to the untrusted server computing device.

17. The untrusted computing device of claim 11 wherein the first fuzziness parameter corresponds to:

$|w|-q-q-\text{ED}$ where $|w|$ is a length of the search keyword, $q$ is a predetermined q-gram number used to form the encrypted tree, and ED is a numeric edit distance quantity generated by the client computing device as part of the search token; and the second fuzziness parameter corresponds to $U_{LEN}+q+q*\text{ED}$ where $U_{LEN}$ is the predetermined maximum keyword length.

18. The untrusted computing device of claim 11 wherein the first predetermined similarity threshold and the second predetermined similarity threshold are both zero, the first inner product value exceeding the first predetermined similarity threshold in response to the first inner product value having a positive numeric value, and the second inner product value exceeding the second predetermined similarity threshold in response to the second inner product value having a positive numeric value.

* * * * *